United States Patent [19]

Mandai et al.

[11] Patent Number: 4,612,140
[45] Date of Patent: Sep. 16, 1986

[54] NON-LINEAR ELECTRICAL RESISTOR HAVING VARISTOR CHARACTERISTICS

[75] Inventors: Haruhumi Mandai, Osaka; Kazutaka Nakamura, Kyoto; Yasuyuki Naito, Kyoto; Kiyoshi Iwai, Kyoto, all of Japan

[73] Assignee: Murata Manufacturing Co., Ltd., Nagaokakyo, Japan

[21] Appl. No.: 597,359

[22] Filed: Apr. 6, 1984

[30] Foreign Application Priority Data

Apr. 8, 1983 [JP] Japan ................................. 58-62790

[51] Int. Cl.$^4$ .......................... H01B 1/06; C04B 35/46
[52] U.S. Cl. .................................... 252/520; 501/136; 252/521
[58] Field of Search ........ 501/136; 252/518, 62.3 BT, 252/520, 521

[56] References Cited

U.S. PATENT DOCUMENTS

| 4,101,454 | 7/1978 | Kulwicki et al. | 252/62.3 BT |
| 4,119,554 | 10/1978 | Fujiwara | 501/134 |
| 4,309,295 | 1/1982 | McSweeney | 252/62.3 R |
| 4,419,310 | 12/1983 | Burn et al. | 264/61 |
| 4,438,214 | 3/1984 | Masuyama et al. | 501/136 |

FOREIGN PATENT DOCUMENTS

| 0065806 | 12/1982 | European Pat. Off. |  |
| 0066333 | 12/1982 | European Pat. Off. |  |
| 0070540 | 1/1983 | European Pat. Off. |  |
| 54-42643 | 4/1979 | Japan | 501/136 |
| 54-41700 | 12/1979 | Japan | 501/136 |
| 56-36103 | 4/1981 | Japan | 501/136 |
| 58-78414 | 5/1983 | Japan | 501/136 |
| 2027008 | 2/1980 | United Kingdom | 501/136 |

Primary Examiner—Mark L. Bell
Attorney, Agent, or Firm—Finnegan, Henderson, Farabow, Garrett & Dunner

[57] ABSTRACT

A ceramic composition for use in production of non-linear resistors. This composition comprises strontium titanate (or a mixture containing strontium titanate as a major ingredient) and 0.1 to 1.0 mol % of $Er_2O_3$, $Ho_2O_3$ or mixtures thereof. In a preferred composition 0.02 to 0.2 mol % of at least one of $MnO_2$, $Co_2O_3$ or mixtures thereof are included. Non-linear resistors produced using the composition are comparable to those produced from conventional ceramic compositions in the threshold level voltage and non-linear factor but have greatly improved flexural strength.

13 Claims, 1 Drawing Figure

NON-LINEAR ELECTRICAL RESISTOR HAVING VARISTOR CHARACTERISTICS

FIELD OF THE INVENTION

The present invention relates to a ceramic composition for non-linear electrical resistors. More particularly, the present invention is concerned with a ceramic composition which is comprised mainly of strontium titanate and which provides electrical resistors having good non-linear resistance characteristics and a high flexural strength.

BACKGROUND OF THE INVENTION

European Patent 70,540, and West German Patent Application Nos. 3,121,289 and 3,121,290 describe resistors (hereinafter referred to as "varistors") obtained by increasing the resistance at grain boundaries of strontium titanate-base semiconductor ceramics. These varistors are used as ring varistors for absorbing sparks in micromotors. Ring varistors must have a high flexural strength because they are usually fitted in position without a resin dip. This high flexural strength is essential, particularly for varistors for micromotors because of their small size.

Varistors made of the conventional strontium titanate-base semiconductor ceramic described in the above references are low in flexural strength. In order to provide a flexural strength sufficient for practical use, therefore, it is necessary to increase the thickness of varistors to about 1 mm. Such varistors of increased thickness are not suitable for use in micromotors which are desired to be miniaturized.

SUMMARY OF THE INVENTION

An object of the present invention is to provide a ceramic composition which permits production of varistors having good varistor characteristics.

Another object of the present invention is to provide a ceramic composition which permits production of varistors having a high flexural strength.

These and other objects of the present invention will become more apparent from the preferred embodiments and examples.

The present invention relates to a ceramic composition particularly useful for non-linear electrical resistors. It is comprised of strontium titanate and 0.1 to 1.0 mol % of $Er_2O_3$ or $Ho_2O_3$ or mixtures thereof. Such a material has crystal grains that are semiconductors and increased electrical resistance at grain boundaries.

DESCRIPTION OF THE PREFERRED EMBODIMENTS

Figure 1:
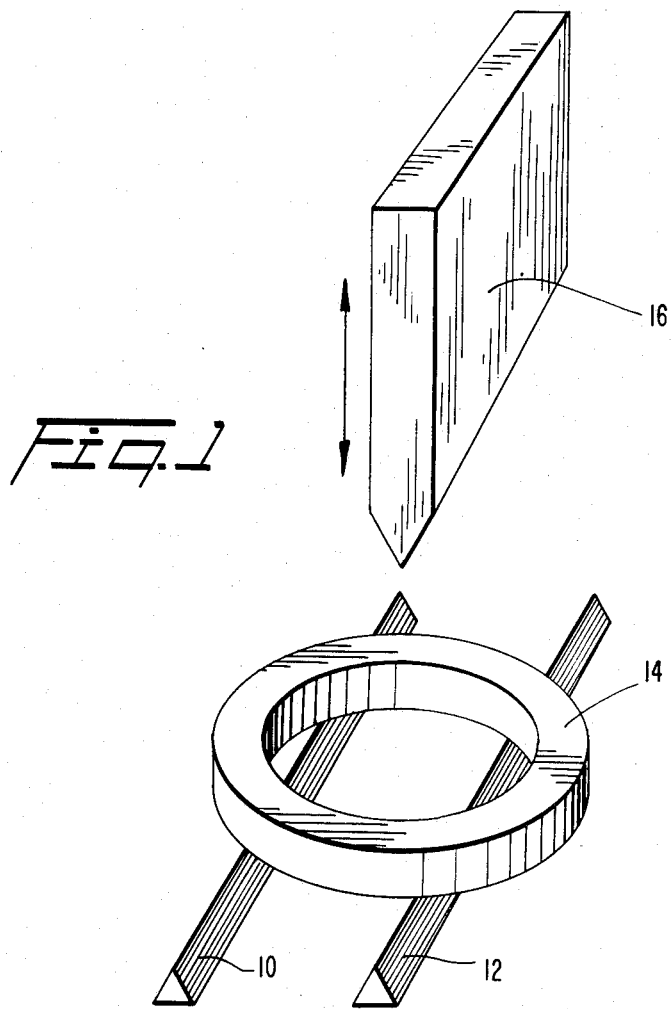
FIG. 1 is a perspective view of a ring-shaped resistor disposed in a three point bending test to determine its flexural strength.

The ceramic composition of the present invention comprises strontium titanate (or a mixture composed mainly of strontium titanate and further containing other titanates, zirconates or stannates) and 0.1 to 1.0 mol % of at least one member of the group consisting of $Er_2O_3$ and $Ho_2O_3$. The ceramic composition may contain more than 60 mol % strontium titanate, and even over about 98 mol % strontium titanate. Preferably strontium titanate comprises from 99.0 to 99.9 mol % of the composition.

If desired, at least one member of the group consisting of $MnO_2$ and $Co_2O_3$ may be added to the above-described ceramic composition in a proportion of from 0.02 to 0.2 mol %. In this preferred embodiment of the present invention, the composition comprises 98.80 to 99.88 mol % of strontium titanate (or a mixture composed mainly of strontium titanate and further containing other titanates, zirconates or stannates), 0.1 to 1.0 mol % of at least one member of the group consisting of $Er_2O_3$ and $Ho_2O_3$, and 0.02 to 0.2 mol % of at least one member of the group consisting of $MnO_2$ and $Co_2O_3$.

If the amount of at least one member of the group consisting of $Er_2O_3$ and $Ho_2O_3$ being compounded in the ceramic composition of the present invention is less than 0.1 mol %, the flexural strength undesirably drops, whereas if it is in excess of 1.0 mol %, the threshold level voltage (Vth) increases. Thus, the amount of at least one member of the group consisting of $Er_2O_3$ and $Ho_2O_3$ is chosen within the range of from 0.1 to 1.0 mol %.

In the latter embodiment where $Er_2O_3$ and $Ho_2O_3$ are added, the $MnO_2$ and $Co_2O_3$ are added to increase the non-linear factor ($\alpha$). If the amount of at least one member of the group consisting of $MnO_2$ and $Co_2O_3$ is less than 0.02 mol %, the effect of increasing the non-linear factor ($\alpha$) is insufficient; whereas if it is in excess of 0.2 mol %, the threshold level voltage (Vth) undesirably increases.

In still another embodiment of the present invention, no more than 5 mol % of a mineralizer, such as $Al_2O_3$, $SiO_2$ or $B_2O_3$, is added to the above-described ceramic composition. If the amount of the mineralizer added is more than 5 mol %, electrical characteristics of the composition are adversely affected.

In another preferred embodiment of the present invention, the ceramic composition comprises 99.75 to 99.85 mol % of strontium titanate (or a mixture composed mainly of strontium titanate and further containing other titanates, zirconates or stannates) and 0.15 to 0.25 mol % of at least one member of the group consisting of $Er_2O_3$ and $Ho_2O_3$.

In still another preferred embodiment of the present invention, the ceramic composition comprises 99.58 to 99.80 mol % of strontium titanate (or a mixture composed mainly of strontium titanate and further containing other titanates, zirconates or stannates), 0.15 to 0.25 mol % of at least one member of the group consisting of $Er_2O_3$ and $Ho_2O_3$, and 0.05 to 0.17 mol % of at least one member of the group consisting of $MnO_2$ and $Co_2O_3$.

Preferably, the amount of binder used in the present invention is in the range of from 3 to 10% by weight based on the weight of powder mixture. Preferably the binder is a water soluble binder such as vinyl acetate polyvinyl alcohol although a solvent based binder such as butyral may be used. It is particularly preferred that the addition of binder used in the present invention amount to from 5 to 8% by weight based on the weight of powder mixture. Thus, the amount of at least one member of the group consisting of $MnO_2$ and $Co_2O_3$ should be controlled to the range of from 0.02 to 0.2 mol %.

The present invention is described in greater detail with reference to the following Examples and Comparative Examples, but the present invention should not be construed as being limited thereto.

EXAMPLE 1

In this example, $SrTiO_3$, $CaTiO_3$ and $BaZrO_3$ were used singly or in combination with each other as the major component, and $Er_2O_3$ and $Ho_2O_3$ were used, singly or as a mixture thereof, as the semiconductorizing agent. The major component and the semiconductorizing agent were mixed in the amounts shown in Table 1, and 5% by weight of a binder was added thereto. The resulting mixture was wet-blended and crushed for about 10 hours. The material thus prepared was dehydrated, passed through a 30 mesh screen made of Saran (polychlorovinylidene) to remove coarse grains, and compacted in the form of a ring in a mold measuring 13.5 mm in outer diameter, 8 mm in inner diameter, and 1.2 mm in thickness. The compacted ring was preliminarily fired at 1,100° C. for 1 hour and subsequently sintered in a reducing atmosphere consisting of 97% nitrogen and 3% hydrogen at 1,380° C. for 2 hours. The thus-prepared material was such that the crystal grains of the ceramic material were semiconductive and the resistance at grain boundaries of the ceramic material was increased. The dimensions of the sintered ring were as follows: outer diameter, 11 mm; inner diameter, 6.6 mm; and thickness, 1 mm.

One side of the sintered ring was provided with three silver electrodes with a clearance of 1.5 mm between them, and the other side was entirely covered with a silver electrode to form a varistor. The varistor was connected to a constant-current power source, and its voltage values, $E_1$ and $E_{10}$ at 1 mA and 10 mA, respectively, were measured. The threshold level voltage (Vth) was determined by $E_{10}$, and the non-linear factor ($\alpha$) was calculated from the following equation:

$$\alpha = \frac{1}{\log E10/E1}$$

The flexural strength was measured by the use of a static three-point bending test as depicted in FIG. 1. Triangular support members 10 and 12 are 7 mm apart and supported the specimen 14. The load is applied to the specimen 14 between the two supporting members 10 and 12 by the load member 16. Just prior to failure the load (in Kg) is recorded and reported in the following data as the flexural strength.

In Table 1, the symbol (*) indicates that the sample does not fall within the scope of the present invention.

TABLE 1

| Sample No. | Major Component (mol %) | Semiconductorizing Agent (mol %) | Vth (v) | α | Flexural Strength (kg) |
|---|---|---|---|---|---|
| 1-1 | $SrTiO_3$: 99.7 | $Er_2O_3$: 0.3 | 13.7 | 4.1 | 3.3 |
| 1-2 | $SrTiO_3$: 99.7 | $Ho_2O_3$: 0.3 | 10.6 | 3.8 | 3.1 |
| 1-3 | $SrTiO_3$: 97.9 $CaTiO_3$: 2.0 | $Er_2O_3$: 0.1 | 12.6 | 4.6 | 3.0 |
| 1-4 | $SrTiO_3$: 99.0 | $Er_2O_3$: 1.0 | 22.4 | 5.2 | 3.1 |
| 1-5 | $SrTiO_3$: 97.9 $CaTiO_3$: 2.0 | $Ho_2O_3$: 0.1 | 14.1 | 4.7 | 3.1 |
| 1-6 | $SrTiO_3$: 99.0 | $Ho_2O_3$: 1.0 | 17.6 | 5.0 | 3.4 |
| 1-7 | $SrTiO_3$: 97.4 | $Er_2O_3$: 0.3 | 18.8 | 5.0 | 3.2 |

TABLE 1-continued

| Sample No. | Major Component (mol %) | Semiconductorizing Agent (mol %) | Vth (v) | α | Flexural Strength (kg) |
|---|---|---|---|---|---|
| 1-8 | $BaZrO_3$: 2.0 $SrTiO_3$: 89.7 $CaTiO_3$: 10.0 | $Ho_2O_3$: 0.3 $Er_2O_3$: 0.3 | 25.2 | 6.0 | 3.0 |
| 1-9 | $SrTiO_3$: 89.5 $BaZrO_3$: 10.0 | $Ho_2O_3$: 0.5 | 24.8 | 6.8 | 3.1 |
| 1-10 | $SrTiO_3$: 79.0 $CaTiO_3$: 20.0 | $Ho_2O_3$: 1.0 | 28.8 | 7.1 | 2.8 |
| 1-11 | $SrTiO_3$: 79.2 $BaZrO_3$: 20.0 | $Er_2O_3$: 0.8 | 27.7 | 7.0 | 2.8 |
| 1-12 | $SrTiO_3$: 69.8 $CaTiO_3$: 30.0 | $Ho_2O_3$: 0.2 | 33.1 | 6.8 | 2.9 |
| 1-13* | $SrTiO_3$: 99.95 | $Er_2O_3$: 0.05 | 22.3 | 3.6 | 2.2 |
| 1-14* | $SrTiO_3$: 98.5 | $Ho_2O_3$: 1.5 | 38.5 | 5.7 | 2.9 |

COMPARATIVE EXAMPLE 1

The procedure of Example 1 was repeated using $SrTiO_3$ as the major component, and $Y_2O_3$, $Nb_2O_5$, $WO_3$, $La_2O_3$ and other rare earth oxides, as semiconductorizing agents. The ingredients were mixed in the amounts shown in Table 2.

The samples were tested in the same manner as in Example 1 for the threshold level voltage (Vth), non-linear factor ($\alpha$), and flexural strength. The results are shown in Table 2 below.

TABLE 2

| Comparative Sample No. | Major Component (mol %) | Semiconductorizing Agent (mol %) | Vth (v) | α | Flexural Strength (kg) |
|---|---|---|---|---|---|
| C1-1 | $SrTiO_3$: 99.7 | $Y_2O_3$: 0.3 | 14.6 | 4.2 | 2.3 |
| C1-2 | $SrTiO_3$: 99.7 | $Nb_2O_5$: 0.3 | 9.5 | 3.9 | 2.1 |
| C1-3 | $SrTiO_3$: 99.7 | $WO_3$: 0.3 | 18.2 | 5.3 | 2.4 |
| C1-4 | $SrTiO_3$: 99.7 | $La_2O_3$: 0.3 | 14.2 | 3.9 | 1.9 |
| C1-5 | $SrTiO_3$: 99.7 | $CeO_2$: 0.3 | 10.1 | 4.0 | 2.0 |
| C1-6 | $SrTiO_3$: 99.7 | $Nd_2O_3$: 0.3 | 12.6 | 3.9 | 2.3 |
| C1-7 | $SrTiO_3$: 99.7 | $Pr_2O_3$: 0.3 | 15.6 | 4.6 | 2.2 |
| C1-8 | $SrTiO_3$: 99.7 | $Dy_2O_3$: 0.3 | 14.3 | 5.2 | 2.4 |

A comparison of the data of Tables 1 and 2 shows that incorporation of at least one member of the group consisting of $Er_2O_3$ and $Ho_2O_3$ according to the present invention produces varistors which are comparable to conventional ones in both the threshold level voltage (Vth) and non-linear factor ($\alpha$) but, in addition, are improved in flexural strength by about 20 to 80%.

EXAMPLE 2

The ceramic compositions shown in Table 3, consisting of $SrTiO_3$, $CaTiO_3$ or $BaZrO_3$ as the major component, $Er_2O_3$ or $Ho_2O_3$ as a semiconductorizing agent and $MnO_2$ or $Co_2O_3$ as a varistor characteristic-improving agent, were prepared and, thereafter, treated in the same manner as in Example 1 to produce varistor samples.

These samples were measured in the same manner as in Example 1 for the threshold level voltage (Vth), non-linear factor ($\alpha$), and flexural strength. The results are also shown in Table 3. In Table 3, the symbol (*) indicates that the sample does not fall within the scope of the present invention.

TABLE 3

| Sample No. | Major Component (mol %) | Semiconductorizing Agent (mol %) | Varistor Characteristic-Improving Agent (mol %) | Vth (v) | α | Flexural Strength (kg) |
|---|---|---|---|---|---|---|
| 2-1 | $SrTiO_3$: 99.66 | $Er_2O_3$: 0.3 | $MnO_2$: 0.04 | 13.9 | 5.1 | 3.2 |
| 2-2 | $SrTiO_3$: 99.66 | $Ho_2O_3$: 0.3 | $MnO_2$: 0.04 | 12.0 | 4.8 | 3.2 |

TABLE 3-continued

| Sample No. | Major Component (mol %) | Semiconductorizing Agent (mol %) | Varistor Characteristic-Improving Agent (mol %) | Vth (v) | α | Flexural Strength (kg) |
|---|---|---|---|---|---|---|
| 2-3 | $SrTiO_3$: 99.5 | $Er_2O_3$: 0.3 | $Co_2O_3$: 0.2 | 18.3 | 6.9 | 3.2 |
| 2-4 | $SrTiO_3$: 97.68 $BaZrO_3$: 2.0 | $Er_2O_3$: 0.3 | $MnO_2$: 0.02 | 19.7 | 7.2 | 3.1 |
| 2-5 | $SrTiO_3$: 99.5 | $Ho_2O_3$: 0.3 | $MnO_2$: 0.2 | 20.0 | 7.0 | 3.3 |
| 2-6 | $SrTiO_3$: 97.68 $BaZrO_3$: 2.0 | $Ho_2O_3$: 0.3 | $Co_2O_3$: 0.02 | 18.2 | 6.5 | 3.3 |
| 2-7 | $SrTiO_3$: 99.56 | $Er_2O_3$: 0.2 $Ho_2O_3$: 0.2 | $MnO_2$: 0.04 | 18.6 | 6.0 | 3.2 |
| 2-8 | $SrTiO_3$: 97.66 $CaTiO_3$: 2.0 | $Ho_2O_3$: 0.3 | $MnO_2$: 0.02 $Co_2O_3$: 0.02 | 16.7 | 7.0 | 3.2 |
| 2-9 | $SrTiO_3$: 88.98 $CaTiO_3$: 10.00 | $Er_2O_3$: 1.00 | $MnO_2$: 0.02 | 24.1 | 6.5 | 3.3 |
| 2-10 | $SrTiO_3$: 89.55 $BaZrO_3$: 10.00 | $Ho_2O_3$: 0.40 | $Co_2O_3$: 0.05 | 22.7 | 7.0 | 2.9 |
| 2-11 | $SrTiO_3$: 79.20 $CaTiO_3$: 20.00 | $Ho_2O_3$: 0.70 | $MnO_2$: 0.10 | 23.5 | 7.8 | 3.0 |
| 2-12 | $SrTiO_3$: 79.50 $BaZrO_3$: 20.00 | $Er_2O_3$: 0.40 | $MnO_2$: 0.05 $Co_2O_3$: 0.05 | 26.8 | 7.5 | 3.1 |
| 2-13 | $SrTiO_3$: 69.70 $CaTiO_3$: 30.00 | $Ho_2O_3$: 0.20 | $Co_2O_3$: 0.10 | 29.8 | 7.2 | 2.9 |
| 2-14* | $SrTiO_3$: 99.94 | $Er_2O_3$: 0.05 | $MnO_2$: 0.01 | 15.4 | 5.5 | 2.0 |
| 2-15* | $SrTiO_3$: 98.0 | $Ho_2O_3$: 1.5 | $Co_2O_3$: 0.5 | 48.3 | 5.3 | 3.0 |

COMPARATIVE EXAMPLE 2

The ceramic compositions shown in Table 4, consisting of $SrTiO_3$ as the major component, $Y_2O_3$, $Nb_2O_5$, $WO_3$, $La_2O_3$, or the like as the semiconductorizing agent, and $MnO_2$ or $Co_2O_3$ as the varistor characteristic-improving agent were prepared and, thereafter, treated in the same manner as in Example 1 to produce varistor samples.

These samples were measured in the same manner as in Example 1 for the threshold level voltage (Vth), non-linear factor (α), and flexural strength. The results are also shown in Table 4.

TABLE 4

| Sample No. | Major Component (mol %) | Semiconductorizing Agent (mol %) | Varistor Characteristic-Improving Agent (mol %) | Vth (v) | α | Flexural Strength (kg) |
|---|---|---|---|---|---|---|
| C2-1 | $SrTiO_3$: 99.66 | $Y_2O_3$: 0.3 | $MnO_2$: 0.04 | 16.7 | 5.2 | 2.2 |
| C2-2 | $SrTiO_3$: 99.66 | $Nb_2O_5$: 0.3 | $MnO_2$: 0.04 | 10.5 | 4.6 | 2.2 |
| C2-3 | $SrTiO_3$: 99.66 | $Wo_3$: 0.3 | $MnO_2$: 0.04 | 19.3 | 5.8 | 2.2 |
| C2-4 | $SrTiO_3$: 99.66 | $La_2O_3$: 0.3 | $MnO_2$: 0.04 | 15.9 | 4.6 | 2.1 |
| C2-5 | $SrTiO_3$: 99.66 | $CeO_2$: 0.3 | $MnO_2$: 0.04 | 11.7 | 4.4 | 2.2 |
| C2-6 | $SrTiO_3$: 99.66 | $Nd_2O_3$: 0.3 | $MnO_2$: 0.04 | 13.0 | 4.5 | 2.0 |
| C2-7 | $SrTiO_3$: 99.66 | $Pr_2O_3$: 0.3 | $MnO_2$: 0.04 | 17.8 | 5.5 | 2.2 |
| C2-8 | $SrTiO_3$: 99.66 | $Dy_2O_3$: 0.3 | $MnO_2$: 0.04 | 16.6 | 6.3 | 2.0 |

A comparison of the data of Tables 3 and 4 shows that incorporation of at least one member of the group consisting of $Er_2O_3$ and $Ho_2O_3$ as a semiconductorizing agent and at least one member of the group consisting of $MnO_2$ and $Co_2O_3$ as a varistor characteristic-improving agent produces varistors which are comparable to conventional ones in both the threshold level voltage (Vth) and non-linear factor (α) but, in addition, are improved in flexural strength by about 30 to 65%. It can further be seen that addition of the varistor characteristic-improving agent in the specified amounts disclosed provides varistors which are improved in the non-linear factor (α) as compared with the case in which the amount of the varistor characteristic-improving agent added is outside the disclosed range.

As described above, the use of the ceramic composition of the present invention produces varistors which are improved in flexural strength compared with conventional ceramic compositions. This results in an increase in reliability of varistors and makes it possible to reduce the thickness of such varistors.

The invention has been disclosed in terms of preferred embodiments and examples. The invention is not to be limited thereto but is defined by the appended claims and their equivalents.

What is claimed is:

1. A non-linear electrical resistor consisting essentially of strontium titanate and 0.1 to 1.0 mol % of $Er_2O_3$, $Ho_2O_3$ or mixtures thereof, said non-linear electrical resistor having varistor characteristics and having a granular crystalline structure wherein the grains of said structure are semiconductors and the grain boundaries of said structure have a higher electrical resistance than said grains.

2. The non-linear resistor of claim 1 wherein said resistor includes, in addition to said strontium titanate, a member selected from the group consisting of: titanates other than strontium, zirconates or stannates.

3. The non-linear resistor of claim 1 wherein said resistor is comprised of over about 98 mol % strontium titanate.

4. The non-linear resistor of claim 1 wherein said resistor includes $MnO_2$, $Co_2O_3$ or mixtures thereof.

5. A ceramic non-linear resistor consisting essentially of strontium titanate, 0.1 to 1.0 mol % of $Er_2O_3$, $Ho_2O_3$ or mixtures thereof and 0.02 to 0.2 mol % of $MnO_2$, $Co_2O_3$ or mixtures thereof, said ceramic non-linear resistor having varistor characteristics and having a granular crystalline structure wherein the grains of said structure are semiconductors and the grain boundaries of said structure have a higher electrical resistance than said grains.

6. The non-linear resistor of claim 5 wherein said resistor includes, in addition to said strontium titanate, a member selected from the group consisting of: titanates other than strontium, zirconates and stannates.

7. The non-linear resistor of claim 6 wherein said resistor is more than 60 mol % strontium titanate.

8. The non-linear resistor of claim 6 wherein said resistor comprises from 98.80 to 99.88 mol % of a material selected from the group consisting of strontium titanate mixtures of strontium titanate and titanates other than strontium, zirconates or stannates.

9. A ceramic material consisting essentially of strontium titanate with minor amounts of $ErO_3$, $Ho_2O_3$ or mixtures thereof, said material having a granular crystalline structure wherein the grains in said structure are a semiconductor material consisting essentially of strontium titanate and the grain boundaries of said structure have a higher electrical resistance than said grains.

10. The material of claim 9 wherein said material contains from 0.1 to 1.0 mol %, of $Er_2O_3$, $Ho_2O_3$ or mixtures thereof.

11. The ceramic material of claim 9 wherein said material contains over about 98 mol % strontium titanate.

12. The ceramic material of claim 9 wherein said material further includes from 0.02 to 0.2 mol % of $MnO_2$, $Co_2O_3$ or mixtures thereof.

13. The ceramic material of claim 9 wherein other titanates, zirconates or stannates are substituted for a portion of said strontium titanate.

* * * * *